US010010472B2

(12) United States Patent
Gu et al.

(10) Patent No.: US 10,010,472 B2
(45) Date of Patent: Jul. 3, 2018

(54) LOWER LIMBS REHABILITATION TRAINING ROBOT (71) Applicant: JIMHO ROBOT (SHANGHAI) CO., LTD., Shanghai (CN)

(72) Inventors: Jie Gu, Shanghai (CN); Zhenhua Xu, Shanghai (CN)

(73) Assignee: JIMHO ROBOT (SHANGHAI) CO., LTD., Shanghai (CN)

( * ) Notice: Subject to any disclaimer, the term of this patent is extended or adjusted under 35 U.S.C. 154(b) by 421 days.

(21) Appl. No.: 14/654,723

(22) PCT Filed: Oct. 10, 2013

(86) PCT No.: PCT/CN2013/084941
§ 371 (c)(1),
(2) Date: Jun. 22, 2015

(87) PCT Pub. No.: WO2014/101524
PCT Pub. Date: Jul. 3, 2014

(65) Prior Publication Data
US 2015/0342817 A1    Dec. 3, 2015

(30) Foreign Application Priority Data
Dec. 25, 2012  (CN) .......................... 2012 1 0573143

(51) Int. Cl.
*A61H 1/00*   (2006.01)
*A61H 1/02*   (2006.01)
(Continued)

(52) U.S. Cl.
CPC .............. *A61H 1/0262* (2013.01); *A61G 7/10* (2013.01); *A61H 1/024* (2013.01); *A61H 1/0244* (2013.01);
(Continued)

(58) Field of Classification Search
CPC .............. A61G 7/10; A61H 2201/0192; A61H 2201/5035; A61H 2201/1642;
(Continued)

(56) References Cited

U.S. PATENT DOCUMENTS 6,243,897 B1 *  6/2001  Sumiya .................. A61H 1/003
                                                         482/144
7,374,521 B2    5/2008  Wang
(Continued)

FOREIGN PATENT DOCUMENTS

CN      2827146 Y    10/2006
CN    101224333 A     7/2008
(Continued)

OTHER PUBLICATIONS

Translation of CN101972196.*
(Continued)

*Primary Examiner* — Loan H Thanh
*Assistant Examiner* — Megan Anderson
(74) *Attorney, Agent, or Firm* — Quarles & Brady LLP (57) ABSTRACT A lower limb rehabilitation training robot is provided, which includes a bedstead support and a rising bedstead arranged on the bedstead support, and further includes a linear motion device, a push rod device, a bionic leg arranged at one end of a surface of the rising bedstead and hinged to the rising bedstead, and a bed board configured to support a patient and arranged at another end of the rising bedstead. The linear motion device is arranged between the bedstead support and the rising bedstead, is configured to allow the rising bedstead to slide along the bedstead support, and has one lateral surface connected to the bedstead support and another lateral surface hinged to the rising bedstead. The push rod device is
(Continued)

configured to drive the rising bedstead to rotate around a hinge point where the rising bedstead is hinged to the linear motion device.

17 Claims, 8 Drawing Sheets (51) Int. Cl.
*A61H 5/00* (2006.01)
*B25J 11/00* (2006.01)
*A61G 7/10* (2006.01)

(52) U.S. Cl.
CPC .......... *A61H 1/0266* (2013.01); *B25J 11/009* (2013.01); *A61H 2201/0192* (2013.01); *A61H 2201/1642* (2013.01); *A61H 2201/1676* (2013.01); *A61H 2201/5035* (2013.01); *A61H 2203/0406* (2013.01); *A61H 2203/0456* (2013.01); *Y10S 901/02* (2013.01); *Y10S 901/27* (2013.01); *Y10S 901/29* (2013.01)

(58) Field of Classification Search
CPC .... A61H 2201/0406; A61H 2201/1676; A61H 2203/0456; A61H 1/00; A61H 1/02; A61H 1/0237; A61H 1/024; A61H 1/0244; A61H 1/0262; A61H 1/0266; A61H 3/00; A61H 3/008; A61H 3/0244; A61H 9/0028; A61H 9/005; A61H 2201/0119; A61H 2201/0138; A61H 2201/0142; A61H 2201/1207; A61H 2201/1238; A61H 2201/1246; A61H 2201/1409; A61H 2201/16; A61H 2201/1619; A61H 2201/1621; A61H 2201/1623; A61H 2201/1626; A61H 2201/164; A61H 2201/1652; A61H 2201/50; A61H 2201/5005; A61H 2201/5051; A61H 2203/04; A61H 2203/0406; A61H 2203/0481; A61H 2203/0487; A61H 2205/08; A61H 2205/081; A61H 2205/10; A61H 2205/106; A61H 2205/108; A61H 2205/12; B25J 11/009
USPC ............. 601/5, 23, 33, 34, 35; 606/237, 240
See application file for complete search history.

(56) References Cited

U.S. PATENT DOCUMENTS

| | | | | |
|---|---|---|---|---|
| 2003/0216781 | A1* | 11/2003 | Cuccia | A61G 13/009 606/237 |
| 2011/0137343 | A1 | 6/2011 | Vitko | |

FOREIGN PATENT DOCUMENTS

| | | |
|---|---|---|
| CN | 201091765 Y | 7/2008 |
| CN | 101972196 A | 2/2011 |
| CN | 201767504 U | 3/2011 |
| CN | 201861910 U | 6/2011 |
| CN | 102160716 A | 8/2011 |
| CN | 102641195 A | 8/2012 |
| CN | 203017137 U | 6/2013 |
| CN | 203017323 U | 6/2013 |
| DE | 102004058352 A1 | 6/2006 |
| EP | 1555005 A2 | 7/2005 |

OTHER PUBLICATIONS

The International Search Report dated Jan. 23, 2014 for International Application No. PCT/CN2013/084941.
European Search Report PCT/CN2013084941, dated Jul. 11, 2016, 7 pages.
The State Intellectual Property Office of the People's Republic of China, First Office Action and Search Report, Application No. 201210573143,2, dated Jun. 18, 2015, 7 pages [English Language Summary Only].

* cited by examiner

LOWER LIMBS REHABILITATION TRAINING ROBOT

CROSS-REFERENCE TO RELATED APPLICATIONS

The present application is the national phase of International Application No. PCT/CN2013/084941, titled "LOWER LIMBS REHABILITATION TRAINING ROBOT", filed on Oct. 10, 2013, which claims the benefit of priority to Chinese patent application No. 201210573143.2 titled "LOWER LIMB REHABILITATION TRAINING ROBOT", filed with the Chinese State Intellectual Property Office on Dec. 25, 2012, the entire disclosures of both applications are incorporated herein by reference.

TECHNICAL FIELD

The present application relates to the technical field of medical apparatus, and in particular to a lower limb rehabilitation training robot.

BACKGROUND

A rehabilitation therapy is a new therapy discipline promoting patients and the disabled to restore physical and psychological functions, and is also a new technique specialty. The rehabilitation therapy aims to help patients to restore the abilities of daily life, study, working, labor and social life as soon as possible, thus the patients can integrate into the society and improve the living quality.

In recent years, gait disturbances caused by factors such as traffic accidents, industrial accidents and stroke occur frequently, and the number of patients suffering from the stroke and the spinal cord injuries is continuously increased. These patients not only need to receive an operative treatment or a drug therapy, but also need to receive a scientific rehabilitation training to help restoring the motor function of limbs.

In the traditional rehabilitation training, a doctor and a therapist assist manually the patient with standing and walking trainings, however such passive training pattern has a large working strength and it is not convenient for the patients to perform training at any time. In view of the above issues, a robot is provided presently to perform rehabilitation training on a lower limb of the patients. When the robot is used, a patient can rely on the robot to stand and to perform the movement training of legs through motions of the robot, thus the robot helps the patient to restore the motor function of the lower limb.

However, the existing lower limb rehabilitation training robot can only ensure upright standing of the patients, thus for patients at different rehabilitation stages, especially for the patients at an initial stage of rehabilitation, keeping standing upright is apt to cause discomfort to the patients.

Therefore, a technical issue to be addressed presently by those skilled in the field is to provide a lower limb rehabilitation training robot applicable for patients at different rehabilitation stages, thereby increasing the application scope.

SUMMARY

An object of the present application is to provide a lower limb rehabilitation training robot applicable for patients at different rehabilitation stages, thereby increasing the application scope.

For addressing the above issue, the following technical solutions are provided according to the present application.

A lower limb rehabilitation training robot includes a bedstead support and a rising bedstead arranged on the bedstead support, and further includes:

a linear motion device which is arranged between the bedstead support and the rising bedstead and is configured to allow the rising bedstead to be slidable along the bedstead support, wherein the linear motion device has one lateral surface connected to the bedstead support, and another lateral surface hinged to the rising bedstead;

a push rod device configured to drive the rising bedstead to rotate around a hinge point where the rising bedstead is hinged to the linear motion device;

a bionic leg arranged at one end of a surface of the rising bedstead and hinged to the rising bedstead; and a bed board arranged at another end of the rising bedstead and configured to support a patient.

Preferably, in the lower limb rehabilitation training robot, the linear motion device includes:

a sliding bracket having an upper surface hinged to the rising bedstead and a lower surface provided with a linear sliding block;

a rod mounted on the bedstead support, and the linear sliding block being slidably sleeved on the rod.

Preferably, in the lower limb rehabilitation training robot, the push rod device includes two oblique push rods, the two oblique push rods are arranged at two sides of the rising bedstead, and each of the oblique push rods has one end hinged to the bedstead support and another end hinged to the rising bedstead.

Preferably, in the lower limb rehabilitation training robot, the rising bedstead includes:

a bedstead base plate hinged to the linear motion device and hinged to the push rod device;

two standing plates arranged on the bedstead base plate and being arranged opposite to each other; and a connecting plate mounted on the two standing plates and being movable in a direction perpendicular to the bedstead base plate, the connecting plate being provided with a horizontal rod configured to mount the bionic leg, and the horizontal rod being arranged in parallel with the connecting plate.

Preferably, in the lower limb rehabilitation training robot, a telescopic connecting rod is further provided, which has one end hinged to the connecting plate and another end hinged to the bedstead base plate.

Preferably, in the lower limb rehabilitation training robot, the bionic leg includes:

a hip joint sleeved on the horizontal rod and being movable along an axis of the horizontal rod;

a first connecting member having one end hinged to the hip joint;

a first rod arranged at another end of the first connecting member;

a knee joint provided with a first linear sliding block, the first linear sliding block being sleeved on the first rod and being slidable along the first rod;

a first locking mechanism configured to lock the first linear sliding block;

a second connecting member having one end hinged to the knee joint;

a second rod arranged at another end of the second connecting member;

an ankle joint provided with a second linear sliding block, the second linear sliding block being sleeved on the second rod and being slidable along the second rod;

a second locking mechanism configured to lock the second linear sliding block;

a foot treadle hinged to the ankle joint via a rotatable rotation shaft; and a hip joint electric machine configured to drive the hip joint to rotate, and a knee joint electric machine configured to drive the knee joint to rotate.

Preferably, in the lower limb rehabilitation training robot, a gas spring is further provided, which has one end hinged to the ankle joint, and another end eccentrically hinged, via a connecting sheet, to a hinge point where the ankle joint is hinged to the foot treadle.

Preferably, in the lower limb rehabilitation training robot, the bed board is connected to a bed board push rod, and the bed board push rod has one end hinged to the rising bedstead, and another end hinged to the bed board.

Preferably, in the lower limb rehabilitation training robot, a driving device is provided, which is configured to drive the bed board to move in a direction away from the bionic leg.

Preferably, in the lower limb rehabilitation training robot, a control system configured to control a moving gait of the bionic leg is provided.

According to the above technical solutions, a lower limb rehabilitation training robot is provided according to the present application, which includes a bedstead support and a rising bedstead arranged on the bedstead support, and further includes a linear motion device, a push rod device, a bionic leg and a bed board. The linear motion device is arranged between the bedstead support and the rising bedstead, and is configured to allow the rising bedstead to slide along the bedstead support. One lateral surface of the linear motion device is connected to the bedstead support, and another lateral surface thereof is hinged to the rising bedstead. The push rod device is configured to drive the rising bedstead to rotate around a hinge point where the rising bedstead is hinged to the linear motion device. The bionic leg is arranged at one end of a surface of the rising bedstead, and is hinged to the rising bedstead. The bed board is arranged at another end of the rising bedstead and configured to support a patient. When the lower limb rehabilitation training robot is in use, the patient may lie on the bed board and puts the leg onto the bionic leg, the linear motion device is driven to move the rising bedstead along the bedstead support, meanwhile the push rod device is controlled to raise the rising bedstead, in this way an included angle can be formed between the rising bedstead and the bedstead support. The included angle between the rising bedstead and the bedstead support can be adjusted by an operator according to physical demands of different patients, thereby effectively increasing the application scope of the lower limb rehabilitation training robot.

DETAILED DESCRIPTION

An object of the present application is to provide a lower limb rehabilitation training robot applicable for patients at different rehabilitation stages, to increase the application scope.

For those skilled in the field to better understand technical solutions of the present application, the present application is described in detail in conjunction with drawings and embodiments hereinafter.

Referring to FIGS. 1 to 12, a lower limb rehabilitation training robot is provided according to the present application, which includes a bedstead support 1 and a rising bedstead 2 arranged on the bedstead support 1, and further includes a linear motion device 3, a push rod device 4, a bionic leg 5 and a bed board 6. The linear motion device 3 is arranged between the bedstead support 1 and the rising bedstead 2, and is configured to allow the rising bedstead 2 to slide along the bedstead support 1. One lateral surface of the linear motion device 3 is connected to the bedstead support 1, and another lateral surface thereof is hinged to the rising bedstead 2. The push rod device 4 is configured to drive the rising bedstead 2 to rotate around a hinge point where the rising bedstead 2 is hinged to the linear motion device 3. The bionic leg 5 is arranged at one end of a surface of the rising bedstead 2, and is hinged to the rising bedstead 2. The bed board 6 is arranged at another end of the rising bedstead 2 and configured to support a patient.

Figure 1:
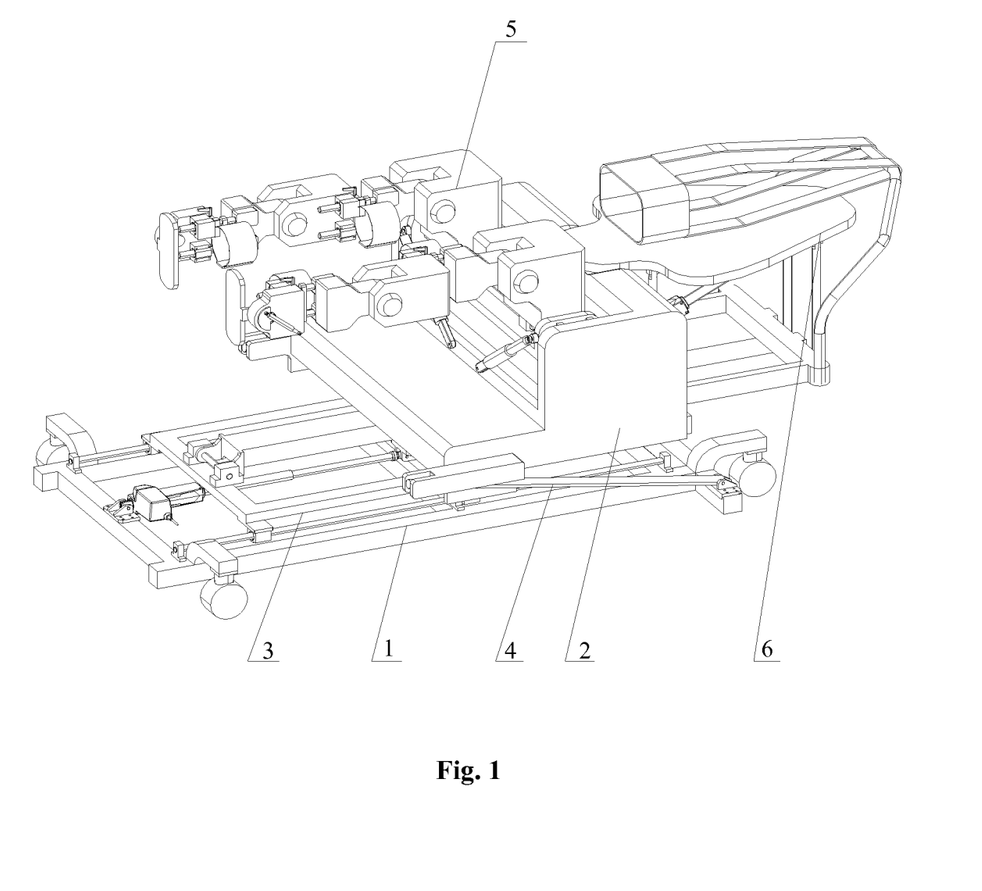
FIG. 1 is a schematic view showing the structure of a lower limb rehabilitation training robot at a horizontal position according to an embodiment of the present application.

When the lower limb rehabilitation training robot is in use, the patient may lie on the bed board 6 and puts the leg onto the bionic leg 5, the linear motion device 3 is driven to move the rising bedstead 2 along the bedstead support 1, meanwhile the push rod device 4 is controlled to raise the rising bedstead 2, in this way an included angle can be formed between the rising bedstead 2 and the bedstead support 1. The included angle between the rising bedstead 2 and the bedstead support 1 can be adjusted by an operator according to physical demands of different patients, to adapt to patients at different rehabilitation stages, thereby effectively increasing the application scope of the lower limb rehabilitation training robot.

By using the above lower limb rehabilitation training robot, patients at an early stage of rehabilitation may lie flat on the bed board to perform rehabilitation training, thus preventing problems caused by no exercise in long time, such as the amyotrophia, and facilitating the later rehabilitation training.

Figure 2:
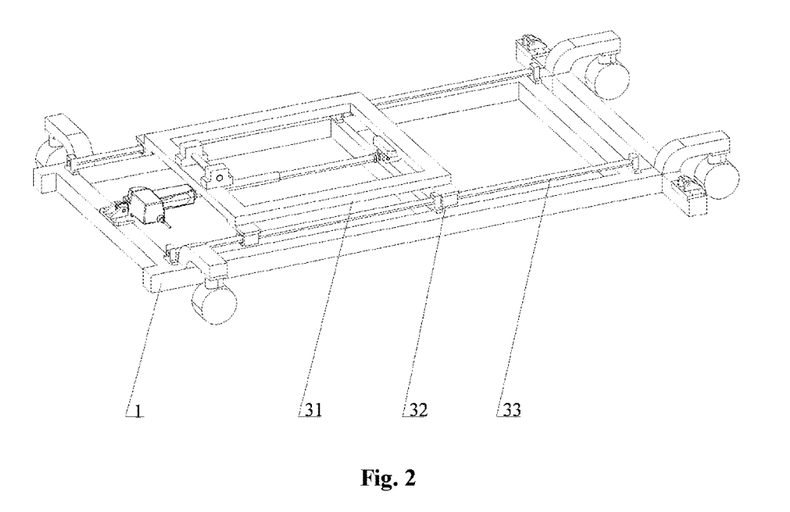
FIG. 2 is a schematic view showing the structure of a bedstead support mounted with a linear motion device according to the embodiment of the present application.

Referring to FIG. 2, in an embodiment, the linear motion device 3 includes a sliding bracket 31 and a rod 33. An upper surface of the sliding bracket 31 is hinged to the rising bedstead 2, and a lower surface of the sliding bracket 31 is provided with a linear sliding block 32. The rod 33 is mounted on the bedstead support 1, and the linear sliding block 32 is slidably sleeved on the rod 33. During the operation, the linear sliding block 32 slides on the rod 33, to realize the relative sliding between the rising bedstead 2 and the bedstead support 1, and further realize the object of adjusting a working position of the lower limb rehabilitation training robot, and meanwhile, the center of gravity of the whole robot can be adjusted to prevent the robot from inclining, which may ensure the safety of patients.

It can be understood by those skilled in the field that, the linear motion device 3 may be embodied as a ball screw structure in actual production. Specifically, a screw rod type guide rail is fixed on the bedstead support 1, a screw nut for cooperating with the screw rod type guide rail is fixed on the rising bedstead 2, and the screw nut is sleeved on the screw rod type guide rail. In using, an electric machine is used to drive the screw rod type guide rail to rotate, thereby enabling the screw nut to move linearly along the screw rod type guide rail, that is, the relative movement between the rising bedstead 2 and the bedstead support 1 is realized. Embodiments of the present application are not limited to the above two connecting ways, and other ways allowing the rising bedstead 2 to move on the bedstead support 1 also fall into the scope of the present application.

In a preferable embodiment, the sliding bracket 31 is embodied as a quadrate bracket, and the linear sliding blocks 32 are arranged on opposite sides of the sliding bracket 31, and two rods 33 are provided and are arranged at two sides of the bedstead support 1 respectively. In the present application, the sliding bracket 31 is embodied as the quadrate bracket, to ensure the cooperation between the sliding bracket 31 and the bedstead support 1. In order to improve the stability of the relative movement between the rising bedstead 2 and the bedstead support 1, the linear sliding blocks 32 are arranged at the opposite sides of the sliding bracket 31, and accordingly, the number of the rods 33 is two, and the number of the linear sliding blocks 32 is four, and the four linear sliding blocks are respectively arranged on the two rods 33, thereby forming two sliding rails. Preferably, the four linear sliding blocks 32 are respectively arranged at four corners of the sliding bracket 31. In specific embodiments, the shape, size, and material of the sliding bracket 31 are not limited and may be selected by a designer according to different requirements and these structures all fall into the scope of the present application.

Figure 3:
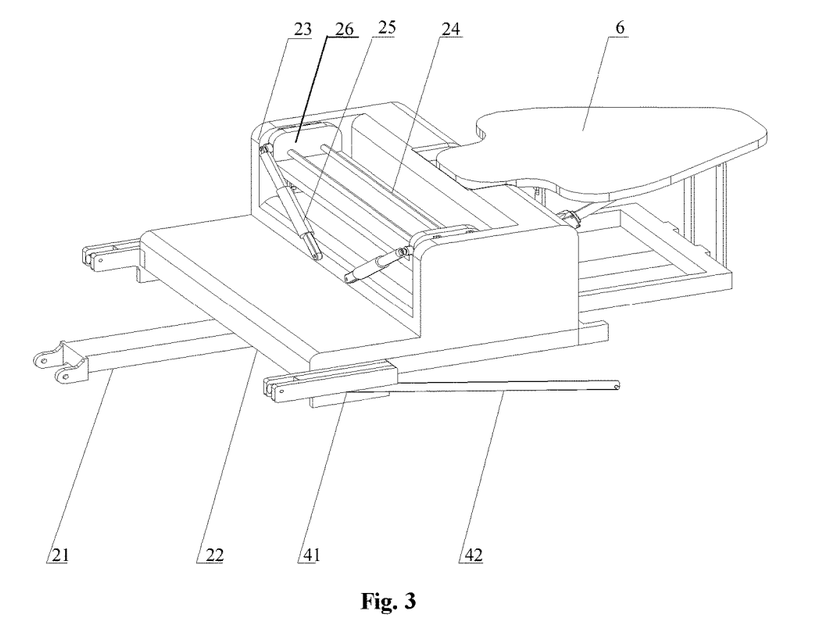
FIG. 3 is a schematic view showing the structure of a rising bedstead according to the embodiment of the present application.

As shown in FIG. 3, in an embodiment, the push rod device 4 is embodied as two oblique push rods 42, and the two oblique push rods 42 are arranged at two sides of the rising bedstead 2. Each of the oblique push rods 42 has one end hinged to the bedstead support 1 and another end hinged to the rising bedstead 2. Based on the above arrangements, the length of the oblique push rod 42 is constant, thus when the rising bedstead 2 is driven by the linear motion device 3 to move, the oblique push rods 42 may drive the rising bedstead 2 to rotate around the hinge point where the rising bedstead 2 is hinged to the linear motion device 3, thereby realizing the rising process of the rising bedstead 2. During this process, as long as the rising bedstead 2 can be driven by the linear motion device 3 to move, the rising of the rising bedstead 2 can be realized. Further, for ensuring that the rising bedstead 2 can be raised to an upright position, a connecting line between the hinge point of an end portion of the linear motion device 3 and the rising bedstead 2 and the hinge point of the oblique push rod 42 and the rising bedstead 2 is arranged to be perpendicular to a moving direction of the linear motion device 3 in actual arrangement.

In a preferable embodiment, each of the oblique push rods 42 is hinged to a fixing block 41 which is in parallel with the rising bedstead 2. A groove is provided at one side of the fixing block 41 close to the hinge point where the rising bedstead 2 is hinged to the linear motion device 3. A rotation shaft is provided in the groove, and the oblique push rod 42 is hinged to the fixing block 41 via the rotation shaft. Another side of the fixing block 41 is a solid structure, which can limit a moving direction of the oblique push rod 42, thereby preventing the oblique push rod 42 from moving in an opposite direction.

In another embodiment, each of the oblique push rods 42 may be embodied as a stretchable telescopic rod. The telescopic rod has one end fixedly connected to the bedstead support 1 and another end hinged to the rising bedstead 2. In the process of the linear motion device 3 driving the rising bedstead 2 to move along the bedstead support 1, the length of the telescopic rod does not change at the beginning, to allow the rising bedstead 2 to rotate around the hinge point where the rising bedstead 2 is hinged to the bedstead support 1, thereby realizing the rising of the rising bedstead 2. When the linear motion device 3 moves to a predetermined position, that is the rising bedstead 2 moves horizontally on the bedstead support 1 to a predetermined position, the linear motion device 3 stops driving the rising bedstead 2 to rotate around the hinge point, and then an extending end of the telescopic rod extends outward to increase the length of the telescopic rod, to allow the rising bedstead 2 to continue rotating around the hinge point until reaches the upright position, thereby completing the process of reaching the upright position of the rising bedstead 2. During this process, on one hand, the linear motion device 3 is used to realize the object of adjusting the center of gravity of the robot, and on the other hand, the extending process of the oblique telescopic rods is used to realize the rising process of the rising bedstead 2. In actual production, the above two structures of the oblique push rods may be selected by the designer according to different requirements.

Referring to FIG. 3, the rising bedstead 2 in the present application includes a bedstead base plate 22 hinged to the linear motion device 3, two standing plates 23 and a connecting plate 26. The bedstead base plate 22 is preferably hinged to the linear motion device 3 via a supporting rod 21 arranged on the bedstead base plate 22, and the bedstead base plate 22 is hinged to the push rod device 4. The two standing plates 23 are arranged on the bedstead base plate 23 and are opposite to each other. The connecting plate 26 is mounted on the two standing plates 23 and is movable in a direction perpendicular to the bedstead base plate 22. A horizontal rod 24 configured to mount the bionic leg 5 is provided on the connecting plate 26, and the horizontal rod 24 is arranged in parallel with the connecting plate 26. Rails perpendicular to the bedstead base plate 22 may be respectively arranged on the standing plates 23, and accordingly sliding blocks for cooperating with the rails are provided at lateral sides of the connecting plate 26, and the sliding blocks may move inside the rails, to allow the connecting plate 26 to move in the direction perpendicular to the bedstead base plate 22.

Two bionic legs 5 may be installed on the horizontal rod 24, the operator may adjust the relative positions of the two bionic legs 5 on the horizontal rod 24 according to the size of the pelvis of the patient by the left-right movements of the bionic legs 5 on the horizontal rod 24. For example, if the pelvis of the patient is large, a distance between the two bionic legs 5 is increased to ensure that the pelvis of the patient can be supported by the connecting plate 26; and if the pelvis of the patient is small, the distance between the two bionic legs 5 can be reduced.

When the bionic legs 5 are not needed, for protecting the bionic legs 5, the operator may adjust the connecting plate 26 to move the bionic legs 5 in the direction perpendicular to the bedstead base plate, to hide the bionic legs 5 below a lower surface of the bed board 6, or expose the bionic legs 5 on an upper surface of the bed board 6. When the bionic legs 5 are required, the connecting plate 26 is moved in a direction away from the bedstead base plate 22, to expose the bionic legs 5 on the upper surface of the bed board 6, thus when the patient lies flat, an upper body of the patient can be supported by the bed board 6, and central axis of each leg just coincides with a central axis of the respective bionic leg 5. In the case that the patient needs to get out of bed or does not use the bionic legs 5, an adjustment opposite to the above adjusting process may be performed. According to the above adjusting processes, adjustments according to the depth of the pelvis of different patients may also be realized by adjusting the movement of the connecting pipe 26 in the direction perpendicular to the bedstead base plate 22. When the depth of the pelvis of a patient is great, the connecting plate 26 is adjusted to move in the direction away from the bedstead base plate 22; and when the depth of the pelvis of the patient is small, the connecting plate 26 is adjusted to move in the direction close to the bedstead base plate 22.

For allowing the connecting plate 26 to move in the direction perpendicular to the bedstead base plate 22, a driving connecting way is provided in the present application. Specifically, a telescopic connecting rod 25 is provided, and has one end hinged to the connecting plate 26 and another end hinged to the bedstead base plate 22. When the telescopic connecting rod 25 extends, the connecting plate 26 may be moved in the direction away from the bedstead base plate 22; and when the telescopic connecting rod 25 retracts, the connecting plate 26 may be moved in the direction close to the bedstead base plate 22. It should be understood by those skilled in the field that, other driving connecting ways may be adopted in actual production and these driving connecting ways all fall into the scope of this embodiment.

Figure 4:
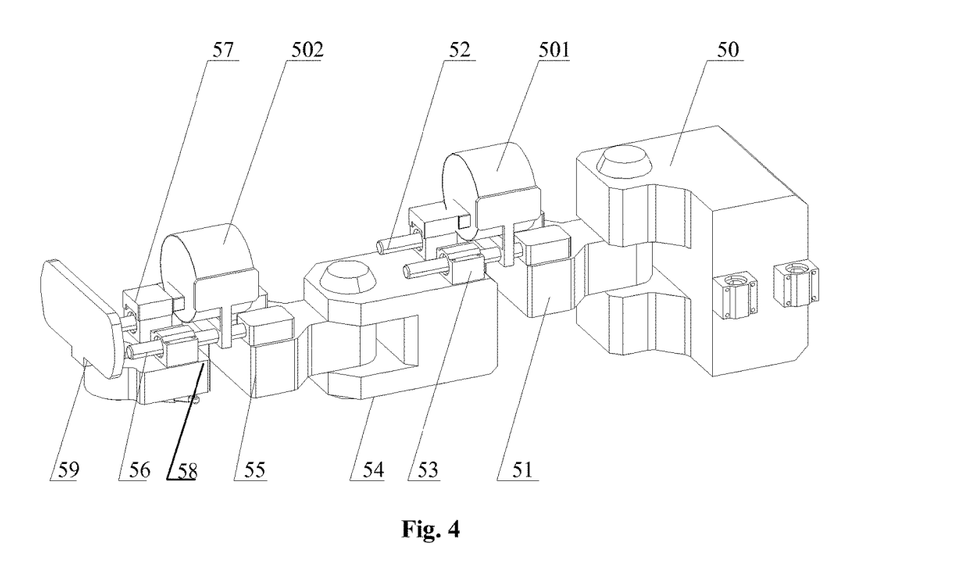
FIG. 4 is a schematic view showing the structure of a bionic leg according to the embodiment of the present application.
Figure 5:
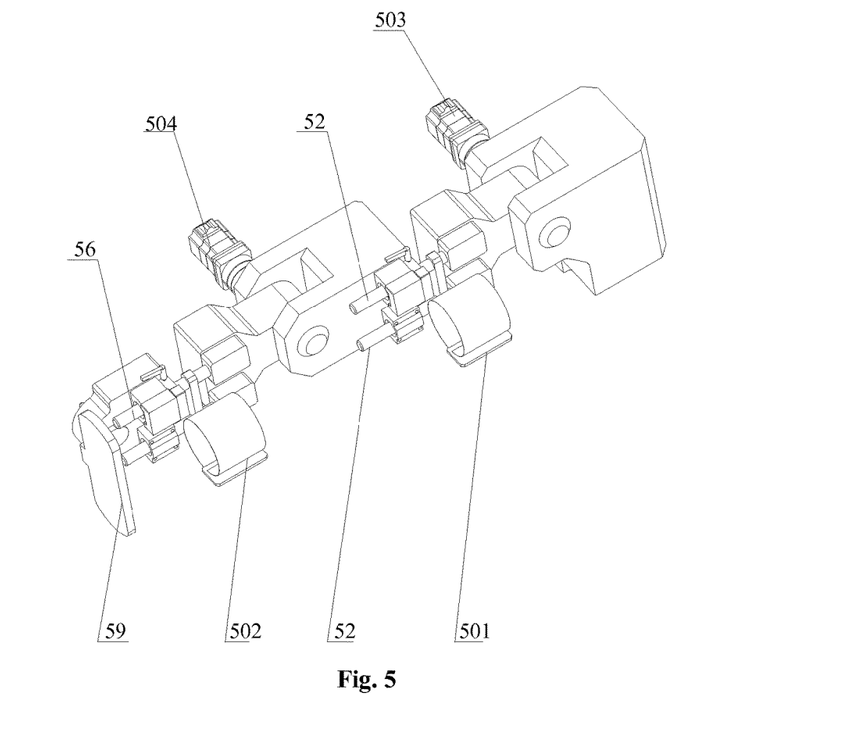
FIG. 5 is a schematic view showing the structure of the bionic leg viewed from another direction according to the embodiment of the present application.

Referring to FIGS. 4 and 5, in a further embodiment, a specific structure of the bionic leg 5 is provided. The bionic leg 5 includes a hip joint 50 sleeved on the respective horizontal rod 24 and movable along the horizontal rod 24, a first connecting member 51 having one end hinged to the hip joint 50, a first rod 52 arranged at another end of the first connecting member 51, a knee joint 54 provided with a first linear sliding block 53, a first locking mechanism configured to lock the first linear sliding block 53, a second connecting member 55 having one end hinged to the knee joint 54, a second rod 56 arranged at another end of the second connecting member 55, an ankle joint 58 provided with a second linear sliding block 57, a second locking mechanism configured to lock the second linear sliding block 57, a foot treadle 59 hinged to the ankle joint 58 via a rotatable rotation shaft, a hip joint electric machine 503 configured to drive the hip joint 50 to rotate, a knee joint electric machine 504 configured to drive the knee joint 54 to rotate, an upper clamping ring 501 configured to clamp and fix the thigh of a user, and a lower clamping ring 502 configured to clamp and fix the shank of the user. The first linear sliding block 53 is sleeved on the first rod 52 and is slidable along the first rod 52. The second linear sliding block 57 is sleeved on the second rod 56 and is slidable along the second rod 56.

The hip joint electric machine is connected to the hip joint 50, and drives the hip joint 50 to rotate around a hinge point where the hip joint 50 is hinged to the hip joint electric machine, and the hip joint 50 is hinged to the first connecting member 51. Preferably, the first connecting member 51 is an accessory of the hip joint, the accessory of the hip joint is provided with a first fixing block, the first rod 52 is arranged on the first fixing block, and the knee joint 54 and the first rod 52 are connected via the first sliding block 53 arranged on the knee joint 54, that is, the first sliding block 53 may move along the first rod 52, thus a distance between the knee joint 54 and the hip joint 50 can be adjusted, to adapt to legs of different lengths and increase the application scope.

When the first sliding block 53 moves to a predetermined position on the first rod 52, the operator may lock the first sliding block 53 via the first locking mechanism, that is, limit the position of the first sliding block 53 on the first rod 52. The accessory of the hip joint and the first rod 52 together form a thigh portion of the bionic leg 5. In using, the rehabilitation training to the hip portion of a patient may be realized via the rotation of the hip joint 50 around the horizontal rod 52; and the rehabilitation training to the thigh portion of the patient may be realized via the rotation of the accessory of the hip joint around the knee joint 54.

The knee joint 54 is connected to the knee joint electric machine and is hinged to the second connecting member 55. Preferably, the second connecting member 55 is an accessory of the knee joint. The accessory of the knee joint is provided with a second fixing block, the second rod 56 is mounted on the second fixing block, and the ankle joint 58 and the second rod 56 are connected via the second sliding block 57 arranged on the ankle joint 58, that is, the second sliding block 57 is movable along the second rod 56, thus a distance between the knee joint 54 and the ankle joint 58 may be adjusted, to adapt to legs of different lengths. When the second sliding block 57 moves to a predetermined position on the second rod 56, the operator may lock the second sliding block 57 via the second locking mechanism, that is, limit the position of the second sliding block 57 on the second rod 56. The accessory of the knee joint and the second rod 56 together form a shank portion of the bionic leg 5. In using, the training to the shank portion of a patient may be realized by the rotation of the accessory of the knee joint around the knee joint 54 and the rotation of the accessory of the knee joint around the ankle joint 58.

The ankle joint 58 is hinged to the foot treadle 59 via the rotatable rotation shaft, thus in using, a patient may put the foot on the foot treadle 59 and tread the foot treadle 59 forward and backward, to realize the rehabilitation training to the ankle portion of the patient.

Figure 6:
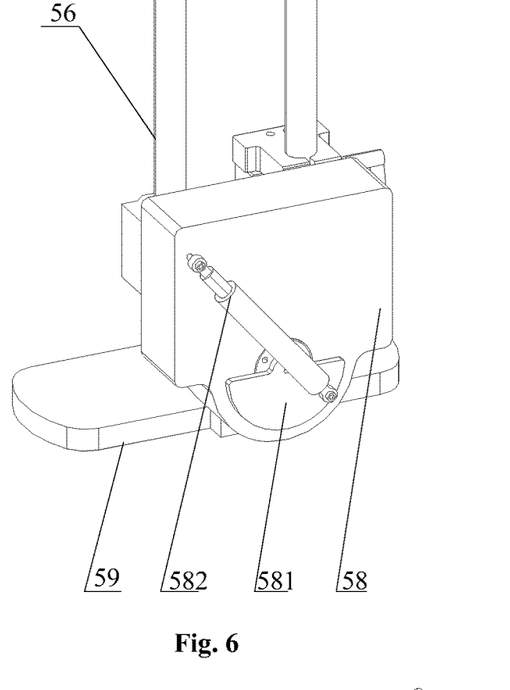
FIG. 6 is a schematic view showing the connection relationship between an ankle joint and a foot treadle according to the embodiment of the present application.
Figure 7:
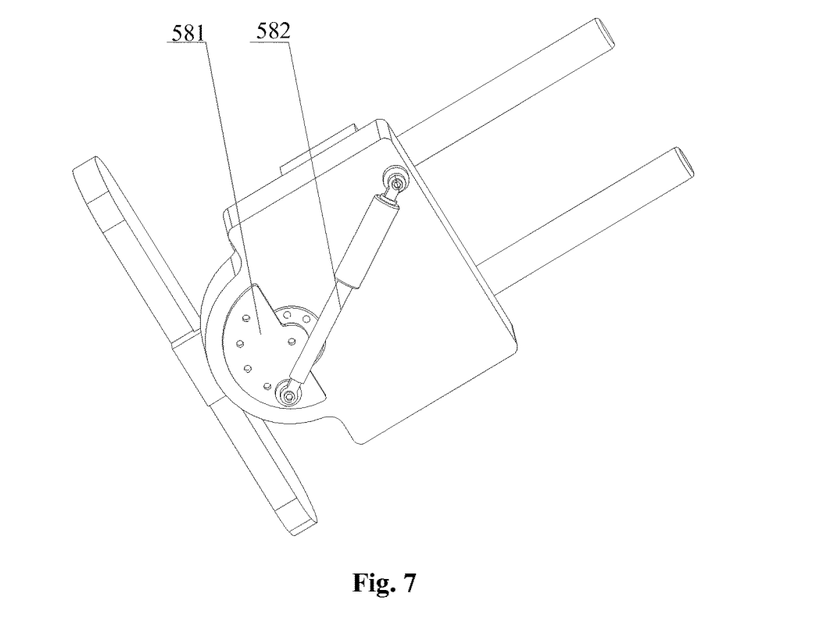
FIG. 7 is a schematic view showing the connection relationship between the ankle joint and the foot treadle viewed from another direction according to the embodiment of the present application.

As shown in FIGS. 6 and 7, a gas spring 582 is further provided in this embodiment, to prevent adverse cases, such as foot drop, from occurring to the patients in training, and to provide muscle strength against the foot drop to the patients through the lower limb rehabilitation training robot, to help patients train the ankle joint 58. The gas spring 582 has one end hinged to the ankle joint 58, and another end eccentrically hinged, via a connecting sheet 581, to a hinge point where the ankle joint 58 is hinged to the foot treadle 59. One side, close to the foot treadle 59, of the ankle joint 58 is a semicircular structure, and the ankle joint 58 is hinged to the foot treadle 59 via one end of the semicircular structure. The foot treadle 59 is rotatable along the semicircular structure. The connecting sheet 581 is arranged on an outer surface of the semicircular structure and is arranged concentrically with the semicircular structure, and the connecting sheet 581 is a semicircular. The gas spring 582 has one end hinged to the ankle joint 58, and another end hinged to the connecting sheet 581, and the gas spring 582 is eccentrically arranged with respect to the rotation shaft.

In using, the patient may put the foot on the foot treadle, when the foot applies a forward force to the foot treadle, that is, applies the force with the sole of the foot, the connecting sheet 581 rotates in the direction same with the rotation direction of the foot treadle 59, namely rotating anticlockwise, thus a distance between two hinge points of the gas spring 582 is reduced, that is, the gas spring 582 is contracted, which provides a resistance to the rotation process and retards the rotation process of the foot treadle 58, and thus the moving speed of the foot of the patient is decreased and the muscle of foot drop of the patient is protected. When the patient applies a backward force to the foot treadle, that is, applies the force with the heel of the foot, the connecting sheet 581 and the foot treadle 59 both rotate reversely, namely rotating clockwise, thus the distance between two hinge points of the gas spring 582 is increased, that is, the gas spring is extended, which provides a resistance to the rotation process and retards the rotation process of the foot treadle 58, and thus the moving speed of the foot of the patient is decreased and the muscle of foot drop of patients is protected.

Referring to FIGS. 8 to 12, to allow patients to get down from or get on to the lower limb rehabilitation training robot conveniently, in this embodiment, the bed board 6 is connected to a bed board push rod 61. The bed board push rod 61 has one end hinged to the rising bedstead 2, and another end hinged to the bed board 6. In normal use, the bed board push rod 61 keeps upright with respect to the rising bedstead 2, to enable a height of an upper surface of the bed board 6 to be same with the height of the axis of the bionic leg 5. In the case that the patient needs to get down from the bed board, the height of the bed board 6 may be decreased by inclining the bed board push rod 61, thus it is convenient for the patient to get down. Specifically, the number of the bed board push rod 61 is four, and the four bed board push rods are respectively hinged at four corners of the bed board 6.

Figure 8:
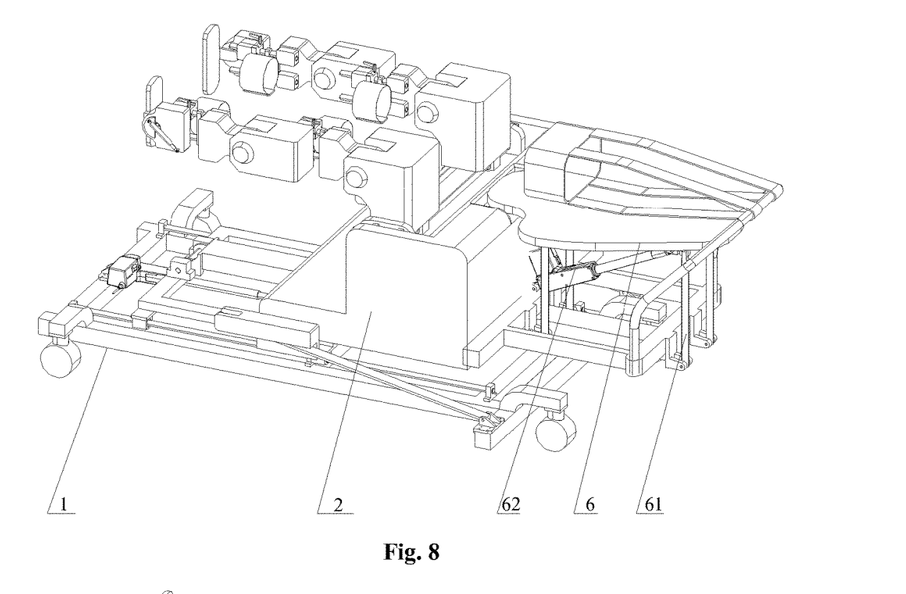
FIG. 8 is a schematic view showing the structure of a bed board of the lower limb rehabilitation training robot according to the embodiment of the present application when the bed board is in a working state.
Figure 9:
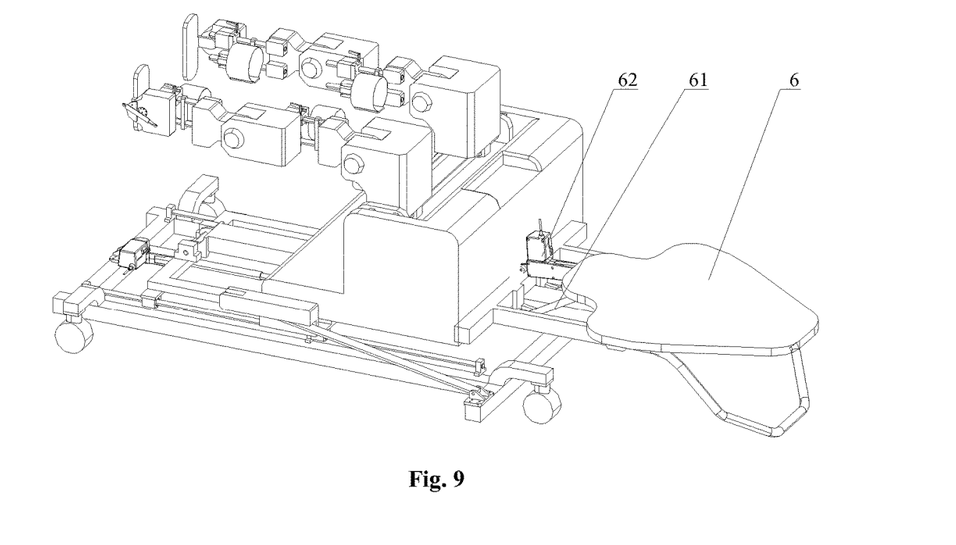
FIG. 9 is a schematic view showing the structure of the bed board of the lower limb rehabilitation training robot according to the embodiments of the present application after the bed board is lowered.
Figure 10:
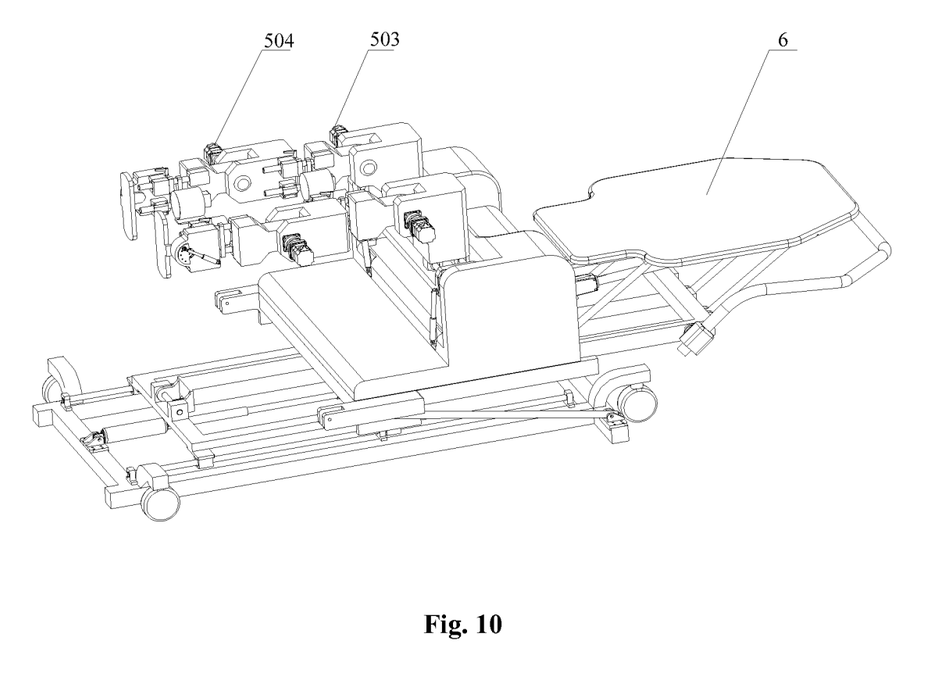
FIG. 10 is a schematic view showing the structure of the bed board of the lower limb rehabilitation training robot viewed from another direction according to the embodiment of the present application after the bed board is lowered.
Figure 11:
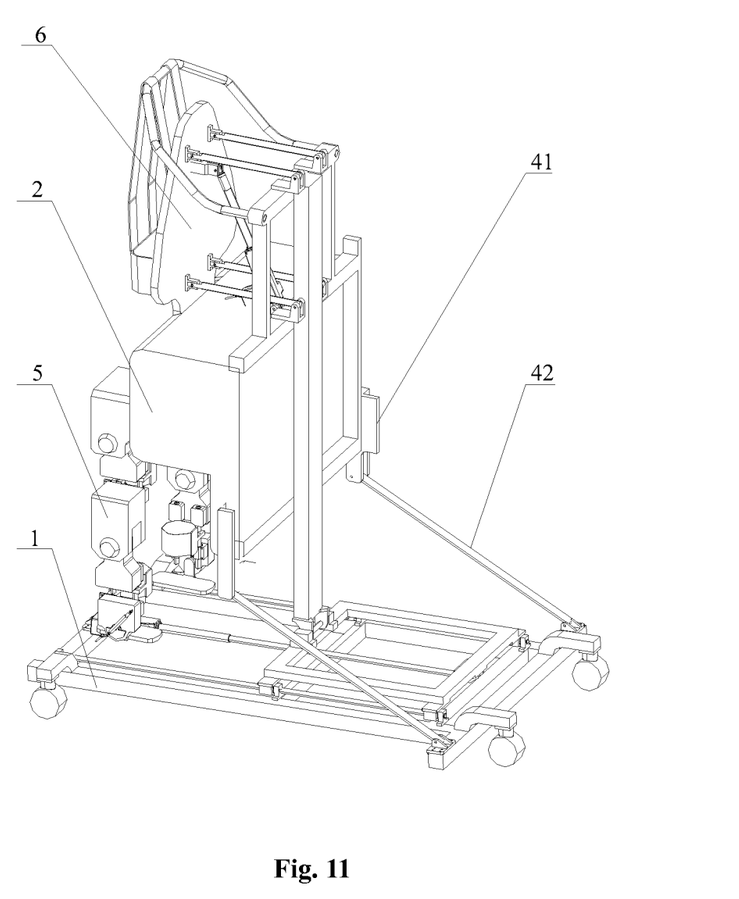
FIG. 11 is a schematic view showing the structure of the lower limb rehabilitation training robot at an upright position according to the embodiment of the present application.
Figure 12:
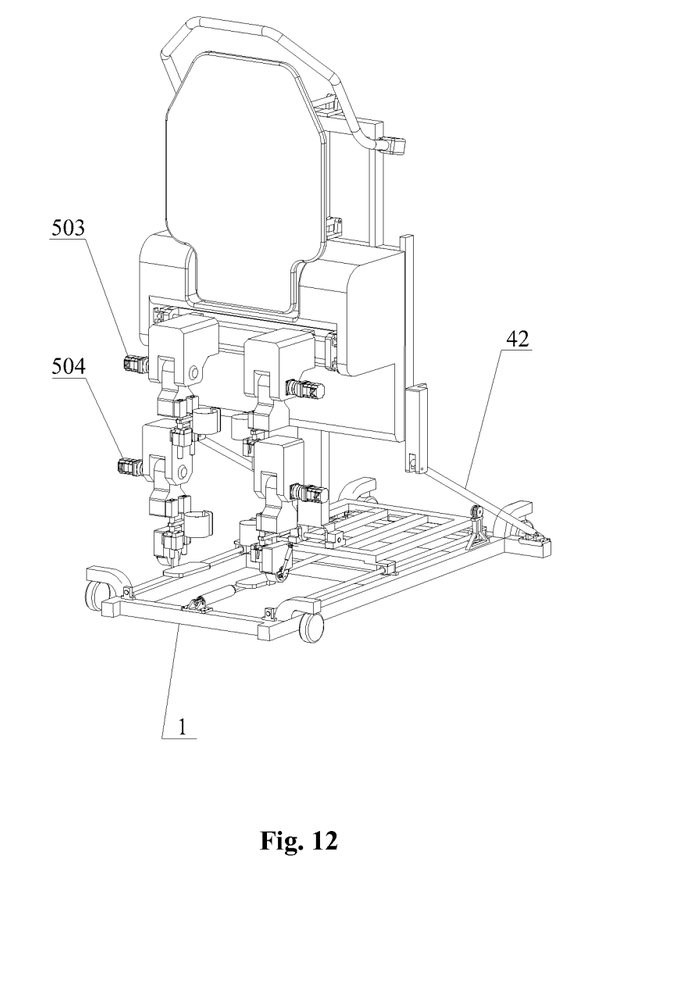
FIG. 12 is a schematic view showing the structure of the lower limb rehabilitation training robot at the upright position viewed from another direction according to the embodiment of the present application.

In a further embodiment, for realizing the movement and location of the bed board push rods 61, a driving device 62 is provided in this embodiment to drive the bed board push rod 61. Movement of the driving device 62 may incline the bed board push rods 61, to change the four bed board push rods 61 from a square to a parallelogram, thereby realizing the object of adjusting the height of the bed board.

In a further embodiment, a control system is provided to control the movement gait of the bionic legs 5. Specifically, a series of programs corresponding to different gaits are set in an industrial personal computer to adapt to patients at different rehabilitation stages, and different gaits can be selected by a superior computer software. It can be understood by those skilled in the field that, a start button and a stop button may merely be set in practical operation, and the patient may start and stop the bionic legs by controlling the start button and the stop button in using, thereby completing movements of the bionic legs 5.

In addition, in practical settings, rotation degrees of the hip joint 50, the knee joint 54 and the ankle joint 58 may be set.

The above embodiments are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the field to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A lower limb rehabilitation training robot, comprising a bedstead support and a rising bedstead arranged on the bedstead support, wherein the lower limb rehabilitation training robot further comprises:
    a linear motion device which is arranged between the bedstead support and the rising bedstead and is configured to allow the rising bedstead to be slidable along the bedstead support, wherein the linear motion device has one lateral surface connected to the bedstead support, and another lateral surface hinged to the rising bedstead;
    a push rod device configured to drive the rising bedstead to rotate around a hinge point where the rising bedstead is hinged to the linear motion device;
    a bionic leg arranged at one end of a surface of the rising bedstead and hinged to the rising bedstead;
    a bed board arranged at another end of the rising bedstead and configured to support a patient; and
    wherein, the linear motion device comprises:
        a sliding bracket having an upper surface hinged to the rising bedstead and a lower surface provided with a linear sliding block; and
        a rod mounted on the bedstead support, and the linear sliding block being slidably sleeved on the rod.

2. The lower limb rehabilitation training robot according to claim 1, wherein the rising bedstead comprises:
    a bedstead base plate hinged to the linear motion device and hinged to the push rod device;
    two standing plates arranged on the bedstead base plate and being arranged opposite to each other; and
    a connecting plate mounted on the two standing plates and being movable in a direction perpendicular to the bedstead base plate, the connecting plate being provided with a horizontal rod configured to mount the bionic leg, and the horizontal rod being arranged in parallel with the connecting plate.

3. The lower limb rehabilitation training robot according to claim 2, wherein the bionic leg comprises:
    a hip joint sleeved on the horizontal rod and being movable along an axis of the horizontal rod;
    a first connecting member having one end hinged to the hip joint;

a first rod arranged at another end of the first connecting member;

a knee joint provided with a first linear sliding block, the first linear sliding block being sleeved on the first rod and being slidable along the first rod;

a first locking mechanism configured to lock the first linear sliding block;

a second connecting member having one end hinged to the knee joint;

a second rod arranged at another end of the second connecting member;

an ankle joint provided with a second linear sliding block, the second linear sliding block being sleeved on the second rod and being slidable along the second rod;

a second locking mechanism configured to lock the second linear sliding block;

a foot treadle hinged to the ankle joint via a rotatable rotation shaft; and a hip joint electric machine configured to drive the hip joint to rotate, and a knee joint electric machine configured to drive the knee joint to rotate.

4. The lower limb rehabilitation training robot according to claim 3, further comprises a gas spring, wherein the gas spring has one end hinged to the ankle joint, and another end eccentrically hinged, via a connecting sheet, to a hinge point where the ankle joint is hinged to the foot treadle.

5. The lower limb rehabilitation training robot according to claim 4, wherein the bed board is connected to a bed board push rod, and the bed board push rod has one end hinged to the rising bedstead, and another end hinged to the bed board.

6. The lower limb rehabilitation training robot according to claim 3, wherein the bed board is connected to a bed board push rod, and the bed board push rod has one end hinged to the rising bedstead, and another end hinged to the bed board.

7. The lower limb rehabilitation training robot according to claim 2, further comprises a telescopic connecting rod, which has one end hinged to the connecting plate and another end hinged to the bedstead base plate.

8. The lower limb rehabilitation training robot according to claim 7, wherein the bed board is connected to a bed board push rod, and the bed board push rod has one end hinged to the rising bedstead, and another end hinged to the bed board.

9. The lower limb rehabilitation training robot according to claim 8, further comprises a driving device configured to drive the bed board to move in a direction away from the bionic leg.

10. The lower limb rehabilitation training robot according to claim 2, wherein the bed board is connected to a bed board push rod, and the bed board push rod has one end hinged to the rising bedstead, and another end hinged to the bed board.

11. The lower limb rehabilitation training robot according to claim 10, further comprises a driving device configured to drive the bed board to move in a direction away from the bionic leg.

12. The lower limb rehabilitation training robot according to claim 1, wherein the push rod device comprises two oblique push rods, the two oblique push rods are arranged at two sides of the rising bedstead, and each of the two oblique push rods has one end hinged to the bedstead support and another end hinged to the rising bedstead.

13. The lower limb rehabilitation training robot according to claim 12, wherein the bed board is connected to a bed board push rod, and the bed board push rod has one end hinged to the rising bedstead, and another end hinged to the bed board.

14. The lower limb rehabilitation training robot according to claim 13, further comprises a driving device configured to drive the bed board to move in a direction away from the bionic leg.

15. The lower limb rehabilitation training robot according to claim 1, wherein the bed board is connected to a bed board push rod, and the bed board push rod has one end hinged to the rising bedstead, and another end hinged to the bed board.

16. The lower limb rehabilitation training robot according to claim 15, further comprises a driving device configured to drive the bed board to move in a direction away from the bionic leg.

17. The lower limb rehabilitation training robot according to claim 15, further comprises a control system configured to control a moving gait of the bionic leg.

* * * * *